Feb. 9, 1971   KATSUJI HASEGAWA   3,562,045
METHOD OF EDGEWISE SPLICING SHEETS OF VENEER
Filed Sept. 9, 1968

INVENTOR.
Katsuji Hasegawa
BY
Attorney

INVENTOR.
Katsuji Hasegawa
BY
Attorney

3,562,045
METHOD OF EDGEWISE SPLICING SHEETS OF VENEER
Katsuji Hasegawa, Nagoya, Japan, assignor to Kabushiki Kaisha Meinan Seisakusho, Nagoya, Japan
Filed Sept. 9, 1968, Ser. No. 758,556
Int. Cl. G03d *15/04*
U.S. Cl. 156—159                                3 Claims

ABSTRACT OF THE DISCLOSURE

This invention relates to a method of edgewise splicing plural sheets of veneer in non-specified lengths obtained by rotatably peeling a log and clipping off the defective and unusable portions therefrom, wherein each veneer sheet is supported in a predetermined position in a first fixed horizontal plane and the front edge thereof is clipped off while the preceding veneer sheet, which has its rear edge already clipped off, is raised out of said horizontal plane to permit discharge of the clipped off front portion of the following sheet, and then the preceding sheet is returned to said horizontal plane; then both sheets are advanced until the rear edge of the succeeding sheet is in said predetermined position, and then the rear portion of said succeeding sheet is clipped off, and then this succeeding sheet is raised out of the horizontal plane to permit discharge of the clipped off rear portion of said succeeding sheet, and then the next succeeding sheet is advanced to bring the front edge thereof into position to be clipped off. After being clipped off, the rear edge of a preceding sheet is bonded to the front edge of the succeeding sheet.

---

Figure 1:
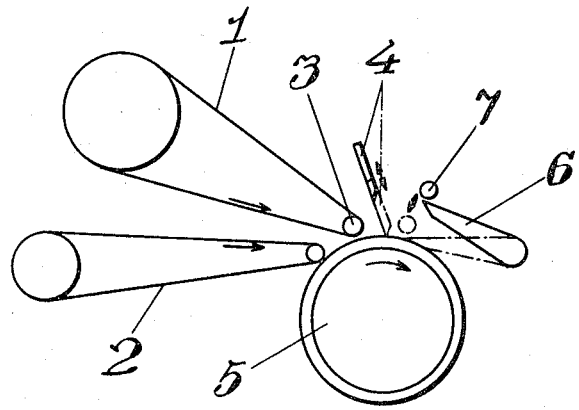

This invention relates to a novel method of edgewise splicing veneer sheets and particularly is concerned with a method of clipping veneer sheets in predetermined lengths.

In the manufacture of plywood, a log is rotatably peeled on a lathe to a more or less continuous sheet of veneer of uniform thickness. Large defects and unusable portions of the sheet are clipped off therefrom, and veneer sheets in non-specified lengths are made. Of such veneer sheets, sheets smaller than the full panel size are clipped at their ends in predetermined lengths in the normal direction to their longitudinal surfaces for use as the face, cross-bond and core members, and thereafter spliced edgewise, that is, taped or edge-glued to the required size.

In the conventional methods, the process of parallel clipping veneer sheets in non-specified lengths to achieve predetermined lengths has been effected separately from the process of bonding veneer sheets already in predetermined lengths. In other words, in the conventional methods, these two processes have been made separately on respective specific machines, or these two processes have been made alternately in different positions. In addition to such disadvantage as necessitating plural machines with the prior methods it has been disadvantageously difficult to obtain the correct alignment of the ends to be bonded.

The edgewise splicing method of this invention eliminates such disadvantages as aforementioned by parallel clipping veneer sheets having non-specified lengths and bonding the sheets to each other in the clipping position.

That is, the principal object of this invention is to provide a method of edgewise splicing plural sheets of veneer of non-specified lengths obtained by rotatably peeling a log and clipping off the defective and unusable portions in a direction normal to the sheets. In the method of the present invention said plural sheets of veneer are moved one after another on a substantially horizontal fixed plane. The veneer sheets are alternately advanced and stopped, the front and rear edges of each sheet being sensed successively, and each sheet being advanced until its front edge is in a predetermined position. The front edge of each sheet is advanced to a predetermined position and is then clipped, while the preceding veneer sheet which has its rear edge already clipped is raised in a vertical direction, to permit discharge from said horizontal plane of the clipped front portion of the succeeding sheet. Then said preceding sheet is lowered, and the succeeding sheet is advanced to bring its rear edge to said predetermined position, and the rear edge of the succeeding sheet is clipped. Then said succeeding sheet is raised out of said horizontal plane to permit discharge from said horizontal plane of the clipped rear portion of said succeeding sheet. When the front edge of each succeeding veneer sheet has been clipped, the preceding sheet, which has been raised to permit discharge of the front edge portion of the succeeding sheet, returns to the same plane as said first horizontal fixed plane so that the front edge of said succeeding veneer sheet aligns with the rear edge already clipped of said preceding veneer sheet. Then the rear edge of the preceding sheet is bonded to the front edge of the succeeding sheet.

Figure 2:
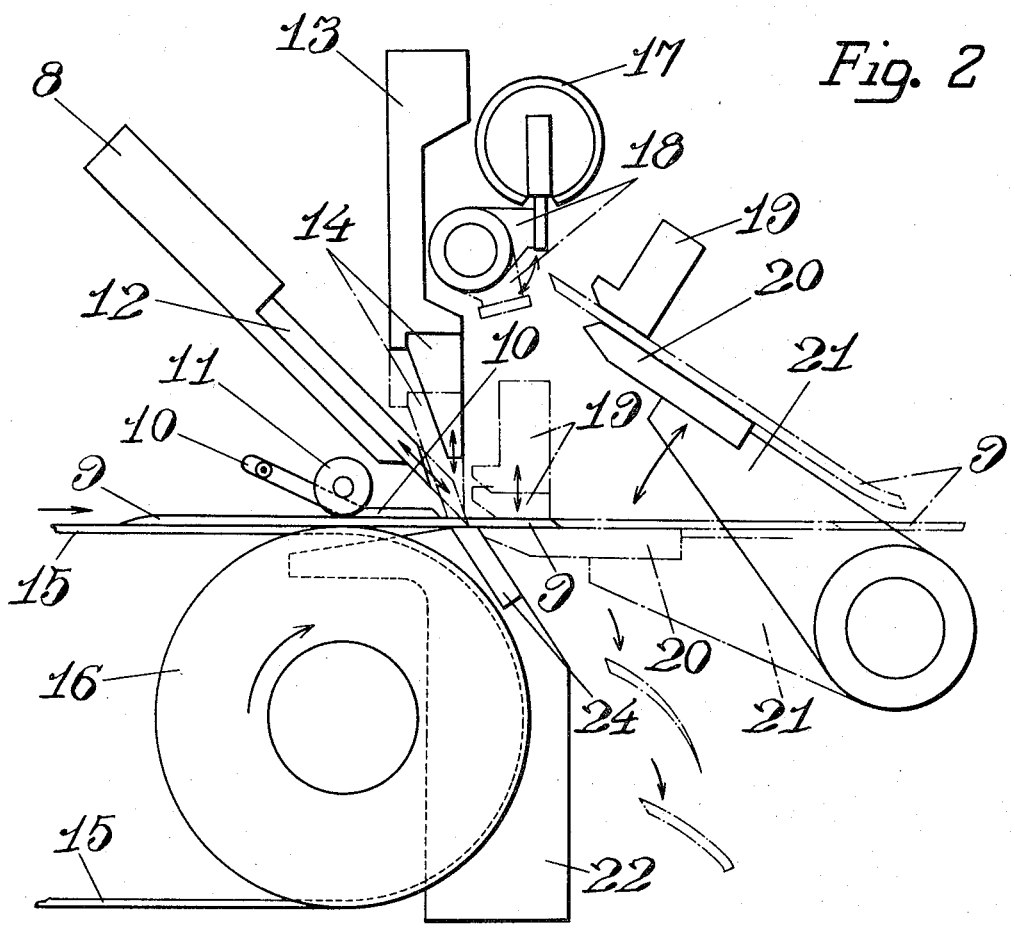
Figure 9:
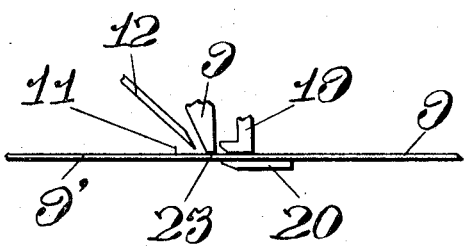
Figure 6:
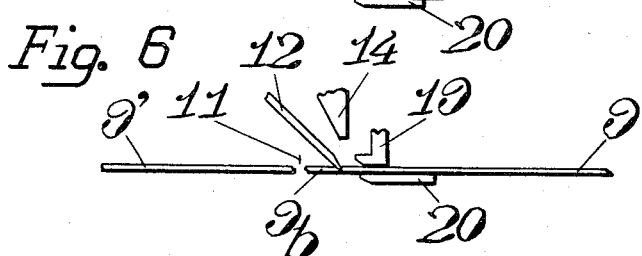
Figure 10:
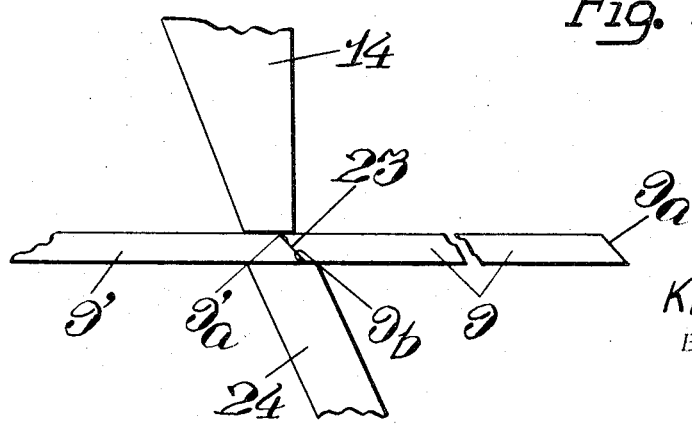

In the accompanying drawings illustrating the method of this invention;

FIG. 1 is an illustrative side elevational view of an example of apparatus embodying the method of this invention, FIG. 2 is an illustrative side elevational view of another example of apparatus embodying the method of this invention, FIGS. 3 through 9 are the illustrative views showing each step in the method of this invention by employing the apparatus illustrated in FIG. 2, and FIG. 10 is an illustrative side elevational view showing preferable clipping and bonding surfaces of veneer sheets in the method of this invention.

Referring now to FIG. 1, the effective clipping position of the front edge of a veneer sheet inserted between conveyors 1, 2 is first detected with a detecting device 3 having a sensitive means, such as a roller for detecting the thickness of the veneer sheet or a photoelectric tube for detecting the end of the sheet. According to the signal from said detecting device 3 the movement of said veneer sheet is stopped for clipping the sheet with a clipper 4. At the time of clipping a veneer sorting bar 6 is in its uplifted position, and the veneer scraps clipped from the front edge of said sheet easily drop and are discharged by blowing compressed air or the like from the back face of said of said veneer sheet. After the veneer scraps have been discharged, said veneer sorting bar 6 is lowered to lead the veneer sheet clipped at the front edge in the normal delivering direction.

Then said conveyors 1, 2 and a clipper receiver and veneer delivering roll 5 are driven to move the veneer sheet again. Said detecting device 3 detects the rear edge of the veneer sheet and the movement of the veneer sheet is stopped in the appropriate clipping position. After the rear edge of the veneer sheet has been clipped with said clipper 4 being driven up and down, the veneer sheet goes up as it is held between a veneer pressing roll 7 and said veneer sorting bar 6 in order to provide an opening for easily discharging out the veneer scraps again. Then, delivery is resumed, and remaining veneer scraps are discharged with the rotation of said clipper receiver and concurrently veneer delivering roll 5 falls. The front edge to be clipped of the next veneer sheet to be inserted is detected similarly to the preceding veneer sheet by the action of said detecting device 3, and according to the signal therefrom the front edge of the succeeding veneer sheet is clipped being followed by the discharge of veneer scraps. After the veneer scraps have been discharged, the preceding veneer sheet is lowered to the original position as it is held between said veneer sorting bar 6 and said veneer pressing roll 7. At this time the clipped edge faces of both the preceding and succeeding veneer sheets align and are closely in contact with each other. Under such conditions, both the veneer sheets are edgewisely spliced by applying a dry pressure tape or the like onto the bonding faces. After the veneer sheets have been bonded together, delivery is resumed to transfer the veneer sheets forward. By repeating such operations, veneer sheets are edgewisely spliced or glued successively.

Referring also to the apparatus illustrated in FIGS. 2 through 9, the method of this invention is explained in more detail as following.

Figure 3:
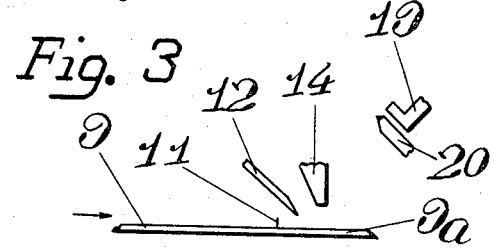
Figure 8:
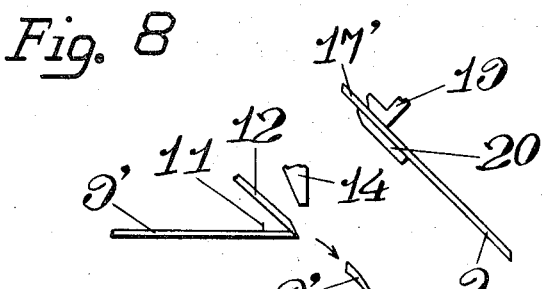

A veneer sheet 9 delivered into the apparatus by a conveyor 15, after its clipping position has been confirmed by a clipping position detecting device 11 and it has stopped at the predetermined forward position simultaneously with said conveyor 15, is clipped with a clipper 12. On the other hand, a veneer receiver 20 is already in the up-position as shown in FIG. 3, and the front edge 9a of said veneer sheet 9 is in the position projecting over the discharge opening for veneer scraps.

Figure 4:
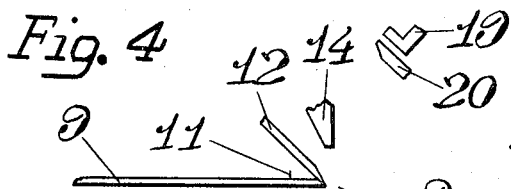
Figure 5:
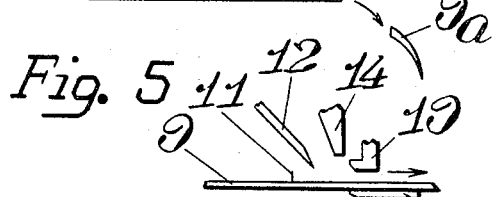

The front edge 9a of said veneer sheet 9 clipped with said clipper 12 is discharged through the discharge opening and falls down as shown in FIG. 4. Then, said veneer receiver 20 is lowered to close the discharge opening as shown in FIG. 5, and said veneer sheet 9 already clipped at said front edge moves forward (in the direction of arrow) along the top face of said veneer receiver 20.

Figure 7:
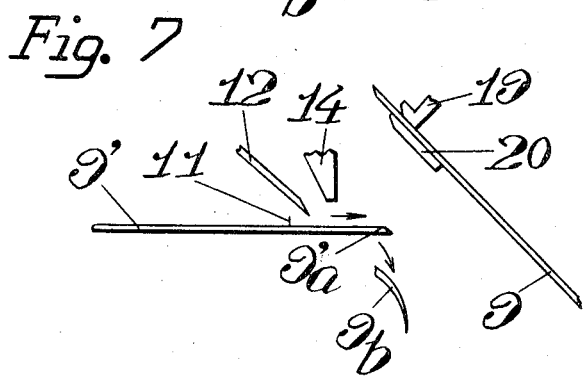

The rear edge 9b of said veneer sheet 9 being forwarded is detected with said detecting device 11 and is clipped by the falling action of said clipper 12 after said veneer sheet 9 has been firmly fixed onto said veneer receiver 20 with the lowered veneer pressing member 19. At the same time, a bonding agent applying arm 18 is lowered as shown by the dotted lines in FIG. 2, and arrangements are made to apply bonding agent to the rear edge splicing face (clipped face) of said veneer sheet 9. After said rear edge 9b of said veneer sheet 9 has been clipped, said veneer sheet 9 is uplifted which being held between said veneer receiver 20 and said veneer pressing member 19 as shown in FIG. 7. Thus, the discharge opening is cleared, namely opened, and said rear edge 9 of said preceding veneer sheet 9 is pushed forward by the succeeding veneer sheet 9 and discharged through the discharge opening. Similarly, as above-mentioned (refer to FIG. 4), the front edge 9'a of said succeeding veneer sheet 9' is clipped with said clipper 12, falls down and is discharged through the discharge opening, and the face to be spliced, namely the clipped face of said preceding veneer sheet 9 has a bonding agent applied to it by means of said arm 18 almost simultaneously with said clipping operation as said preceding veneer sheet 9 is secured to said veneer receiver 20. (Refer to FIGS. 2 and 8).

As shown in FIG. 9, after said front edge 9'a of said succeeding veneer sheet 9' has been clipped, said preceding veneer sheet 9 having said rear splicing face applied with a bonding agent returns downward to the original position since it is held between said veneer receiver 20 and said veneer pressing member 19. The splicing faces of both veneer sheets 9 and 9' are closely in contact with each other, and bonded together, that is, edgewisely spliced by means of both upper and lower hot plates 14, 24 when the former 14 comes down, as shown in FIGS. 2 and 9. In sequence, the aforementioned operations are repeated, and successive veneer sheets are smoothly clipped, glued, and edgewisely spliced together.

Although only one example of said bonding agent applying mechanism 17, 18 has been illustrated, it will be understood as a matter of course that numerous variations are conceivable in designing said mechanism. Further, in consideration of bonding conditions, it is most suitable to design said clipper 12 so as to be capable of clipping obliquely as shown in FIG. 10.

For reference, in FIG. 2 numeral 16 indicates the drive roll for belt conveyor 15, numeral 17 the bonding agent tank, numeral 8 the clipper mount, numeral 21 the mounting arm for the veneer receiver 20, and numeral 22 the lower hot plate mount.

What is claimed is:

1. A method of edgewise splicing plural sheets of veneer of different lengths obtained by rotatably peeling a log, comprising advancing sheets of veneer, one after another, in a horizontal plane, stopping the movement of each sheet when its front edge arrives at a predetermined position in said horizontal plane, raising the preceding sheet out of said horizontal plane, clipping off the front edge of each sheet when its front edge is at said predetermined position, the advance of the sheets, the stoppage of movement of each sheet after its advance, and the clipping off of the front edge of each sheet being effected while the preceding sheet is raised, to permit the clipped off front portion of the succeeding sheet to be discharged from said horizontal plane through the opening thus formed in front of the succeeding sheet, lowering said preceding clipped sheet into said horizontal plane again after discharge of said clipped front portion of the succeeding sheet, then advancing said succeeding sheet until its rear edge reaches said predetermined position, then again stopping said succeeding sheet, clipping its rear edge, then raising said succeeding sheet to permit discharge from said horizontal plane of the clipped off rear portion of said succeeding sheet, and repeating alternate advance, stoppage, clipping, raising, and lowering of successive sheets, to clip off successively the front and rear edges of successive sheets to parallel, matching shapes, and bonding the clipped front and rear edges of successive sheets together.

2. A method of edgewise splicing plural sheets of veneer as claimed in claim 1, wherein a bonding agent is applied to the rear edge of each sheet while the sheet is raised out of said horizontal plane so that when it is lowered said rear edge can adhere to the front edge of the next succeeding sheet.

3. A method of edgewise splicing plural sheets of veneer as claimed in claim 1, wherein the edges of veneer sheets are clipped off obliquely to the horizontal plane so as to give the clipped edges relatively larger bonding faces.

References Cited

UNITED STATES PATENTS

| | | | |
|---|---|---|---|
| 2,378,244 | 6/1945 | Pfenning | 156—304X |
| 2,516,280 | 7/1950 | Welch | 156—304X |
| 2,544,133 | 3/1951 | Carlson | 156—304X |
| 2,571,604 | 10/1951 | Payzant | 156—304X |
| 3,192,094 | 6/1965 | Phillips et al. | 156—353 |
| 3,461,932 | 8/1969 | Shelton et al. | 156—159X |

BENJAMIN R. PADGETT, Primary Examiner

G. G. SOLYST, Assistant Examiner

U.S. Cl. X.R.

156—258, 304, 353